7917X
R. W. BANGS & S. D. WALBRIDGE.
ROLLERS FOR IRON AND STEEL.
Patented Dec. 31, 1833.
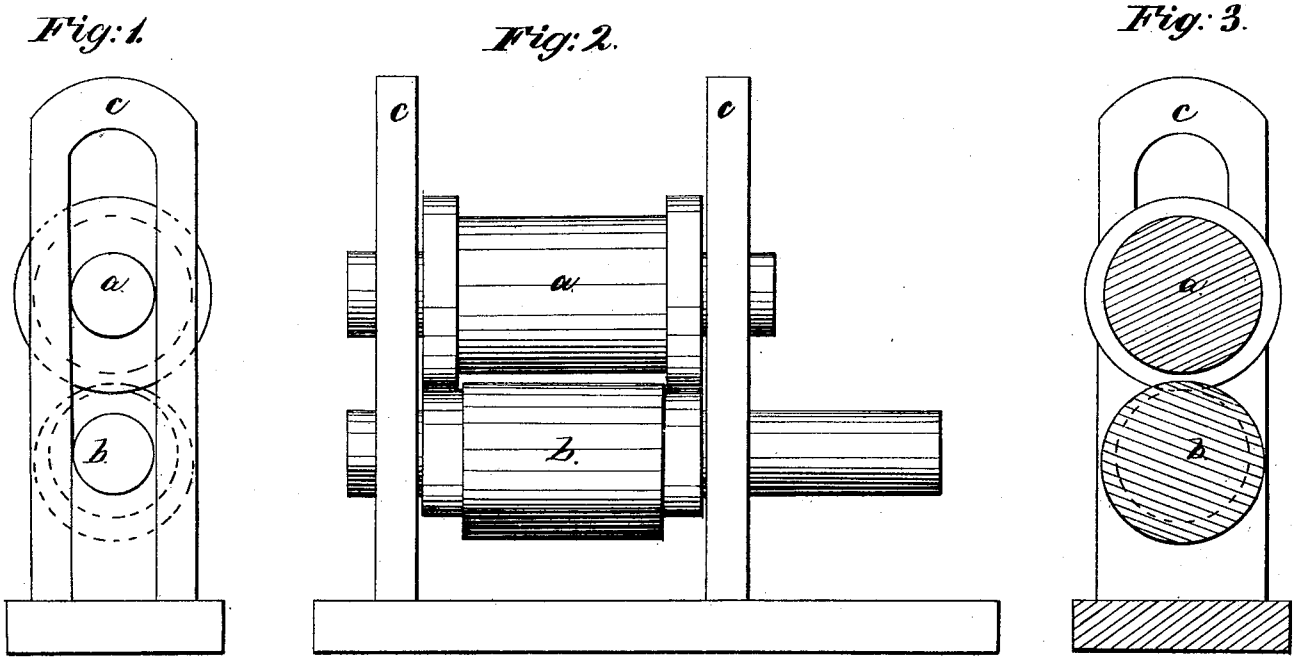
THE NORRIS PETERS CO., PHOTO-LITHO., WASHINGTON, D. C.

7917X

UNITED STATES PATENT OFFICE.

RUFUS W. BANGS AND STEBBINS D. WALBRIDGE, OF BENNINGTON, VERMONT.

IMPROVEMENT IN THE CONSTRUCTION OF ROLLERS FOR THE ROLLING OF IRON, STEEL, AND OTHER METALS.

Specification forming part of Letters Patent dated December 31, 1833.

*To all whom it may concern:*

Be it known that we, RUFUS W. BANGS and STEBBINS D. WALBRIDGE, of Bennington, Vermont, have invented, constructed, made, and applied to use a new and useful Improvement in the Construction of Rollers for the Rolling of Iron, Steel, and other Metals, by which iron, steel, and other metals may be rolled of any given width, with the ends of any given difference in thickness and of a true taper in thickness from end to end, which improvement is and may be applied to the rolling of the said metals for the construction of carpenters' squares, plane-irons, carriage-springs, and any other article or instrument requiring metals to be formed in the aforesaid shape, called the "taper roller," specified in the words following, viz:

The length which the article to be rolled is required to be made determines the size of the driving-roller, which within the groove is to be in circumference of double the length of the article rolled when the required taper is from end to end, and of the precise length of the article when the taper is required to be made from the center to the ends. The taper in the article is obtained by so constructing the driving-roller that its bearings or journals are removed from the center of the surface which is within the groove, while they remain the center of the surface without the groove, by which last surface the rollers are gaged, and the distance to which the surface within the groove is removed from the center determines the quantity of the taper.

In testimony that the above is a true specification of our said improvement we have hereunto set our hands this 14th day of November, A. D. 1833.

RUFUS W. BANGS.
STEBBINS D. WALBRIDGE.

Witnesses:
H. HALL,
JO. L. SPIRGEL.